(12) United States Patent
Ahn

(10) Patent No.: US 9,324,986 B2
(45) Date of Patent: Apr. 26, 2016

(54) BATTERY MODULE

(71) Applicant: SAMSUNG SDI CO., LTD., Yongin-si, Gyeonggi-do (KR)

(72) Inventor: Jang-Gun Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 131 days.

(21) Appl. No.: 14/189,807

(22) Filed: Feb. 25, 2014

(65) Prior Publication Data

US 2014/0356691 A1 Dec. 4, 2014

(30) Foreign Application Priority Data

May 30, 2013 (KR) ........................ 10-2013-0061498

(51) Int. Cl.
| | | |
|---|---|---|
| *H01M 2/20* | (2006.01) | |
| *H01M 2/30* | (2006.01) | |
| *H01M 2/10* | (2006.01) | |
| *H01R 4/48* | (2006.01) | |
| *H01R 11/28* | (2006.01) | |

(52) U.S. Cl.
CPC ............. *H01M 2/206* (2013.01); *H01M 2/204* (2013.01); *H01M 2/305* (2013.01); *H01M 2/1077* (2013.01); *H01R 4/48* (2013.01); *H01R 11/288* (2013.01)

(58) Field of Classification Search
CPC ..... H01M 2/206; H01M 2/1077; H01M 2/30; H01M 2/202; H01M 2/204; H01M 2/305
See application file for complete search history.

(56) References Cited

U.S. PATENT DOCUMENTS

| | | |
|---|---|---|
| 2006/0270286 A1 | 11/2006 | Zhao et al. |
| 2010/0266889 A1 | 10/2010 | Kim |
| 2011/0052970 A1* | 3/2011 | Kurata ................ H01M 2/0404 429/158 |
| 2012/0100761 A1* | 4/2012 | Gro e ..................... H01M 2/202 439/774 |
| 2012/0121966 A1* | 5/2012 | Kim .................. H01M 10/0436 429/158 |
| 2013/0216895 A1* | 8/2013 | Fritz ..................... H01M 2/202 429/158 |
| 2013/0302663 A1* | 11/2013 | Teramoto .............. H01M 2/202 429/160 |
| 2014/0069690 A1* | 3/2014 | Diez ..................... H01M 2/202 174/126.1 |

FOREIGN PATENT DOCUMENTS

| | | |
|---|---|---|
| DE | 10 2011 076 624 A1 | 11/2012 |
| DE | WO 2012163642 A2 * | 12/2012 ............ H01M 2/202 |
| EP | 2 343 755 A1 | 7/2011 |
| JP | 2013-031291 | 2/2013 |
| KR | 10-2010-0114595 A | 10/2010 |
| KR | 10-2011-0067027 A | 6/2011 |

OTHER PUBLICATIONS

EPO Search Report dated Sep. 4, 2014, for corresponding European Patent application 14170146.6, (6 pages).

* cited by examiner

*Primary Examiner* — Stewart Fraser
(74) *Attorney, Agent, or Firm* — Lewis Roca Rothgerber Christie LLP

(57) ABSTRACT

A battery module including: a plurality of battery cells aligned in a direction, the battery cells each including a terminal portion on a surface thereof; and a bus bar configured to connect between the terminal portions of battery cells of the plurality of battery cells, the bus bar including through-regions through which the terminal portions of the battery cells respectively pass, and a connection region connecting the through-regions, and a through-region of the through-regions has two or more through-holes corresponding to each other and through which one of the terminal portions passes, and the terminal portions are forcibly inserted into the bus bar.

20 Claims, 9 Drawing Sheets

BATTERY MODULE

CROSS-REFERENCE TO RELATED APPLICATION

This application claims priority to and the benefit of Korean Patent Application No. 10-2013-0061498, filed on May 30, 2013 in the Korean Intellectual Property Office, the entire content of which is incorporated herein by reference.

BACKGROUND

1. Field

Aspects of embodiments of the present invention relate to a battery module.

2. Description of the Related Art

A high-power battery module using a non-aqueous electrolyte with high energy density has recently been developed. The high-power battery module is configured as a large-capacity battery module manufactured by connecting a plurality of battery cells in series to be used, for example, in driving motors of devices requiring high power, e.g., electric vehicles, hybrid vehicles, and the like. Further, a battery pack can be configured by electrically connecting such a plurality of battery modules to one another.

As the number of devices employing the battery module increases, studies have been conducted to improve the productivity of the battery module. As the external appearance of the devices is diversified, it is required to vary the shape of the battery module. However, the safety of the battery module should be secured. Therefore, studies on the structure of a battery module capable of satisfying all the requirements have been conducted in various fields.

A bus bar is used as a member that connects a plurality of battery cells to each other in a battery module. In a comparable battery module, a separate fixing member, such as a bolt or nut, is used in order to prevent a bus bar from being separated from terminal portions, which is inefficient in terms of cost and time.

SUMMARY

According to an aspect of embodiments of the present invention, a battery module includes a bus bar which is fixable to terminal portions without a separate fixing member.

According to one or more embodiments of the present invention, a battery module includes: a plurality of battery cells aligned in a direction, the battery cells each including a terminal portion on a surface thereof; and a bus bar configured to connect between the terminal portions of battery cells of the plurality of battery cells, the bus bar including through-regions through which the terminal portions of the battery cells respectively pass, and a connection region connecting the through-regions, and a through-region of the through-regions has two or more through-holes corresponding to each other and through which one of the terminal portions passes in a connected state, and the terminal portions are forcibly inserted into the bus bar in the connected state.

The connection region may have a bending portion configured to provide tension to the bus bar, and the bus bar may be fixable to the terminal portions by the tension.

The battery module may further include a cover member configured to cover the surface on which the terminal portions are arranged, the cover member including a rib at a position corresponding to the bending portion.

The through-region may apply a force toward an outside of the bus bar on a terminal portion of the terminal portions that passes through the through-holes of the through-region.

The through-region may include: a first through-region portion extended from the connection region, the first through-region portion having a first through-hole of the two or more through-holes formed therein, and the one of the terminal portions passes through the first through-hole in the connected state; a support region bent to extend from the first through-region portion; and a second through-region portion bent to extend from the support region, the second through-region portion having a second through-hole of the two or more through-holes formed therein, and the one of the terminal portions passes through the second through-hole in the connected state.

Centers of the first and second through-holes may be non-concentric with each other in a state in which the bus bar is separated from the terminal portions.

The support portion may include a protruding portion protruded toward the one of the terminal portions, and the protruding portion may apply a force toward an inside of the bus bar on the one of the terminal portions.

The battery module may further include an auxiliary bus bar mounted inside the bus bar, and the one of the terminal portions may pass between the bus bar and the auxiliary bus bar.

The auxiliary bus bar may include an auxiliary bending portion configured to apply a force to the one of the terminal portions toward an outside of the auxiliary bus bar by providing tension to the auxiliary bus bar.

The connection region may include a first connection region extended from the first through-region portion, and a second connection region extended from the second through-region portion, each of the first and second connection regions including a respective bending portion.

The bending portion of the first connection region and the bending portion of the second connection region may be protruded toward opposite directions from each other.

The first through-region portion may include a first support portion at an outer side portion of the first through-hole and configured to apply a force on the one of the terminal portions toward an inside of the bus bar by contacting a side surface of the one of the terminal portions, and the second through-region portion may include a second support portion at an inner side portion of the second through-hole and configured to apply a force on the one of the terminal portions toward an outside of the bus bar by contacting a side surface of the one of the terminal portions.

The two or more through-holes may include three through-holes formed to correspond to each other and through which the one of the terminal portions passes.

The through-regions may include a first through-region through which the terminal portion of a first battery cell of the plurality of battery cells passes, and a second through-region through which the terminal portion of a second battery cell of the plurality of battery cells adjacent to the first battery cell passes, and the connection region may connect the first and second through-regions.

Each of the first and second through-regions may include a first through-region portion having a first through-hole formed therein, a second through-region portion having a second through-hole formed therein, and a third through-region portion having a third through-hole formed therein, and the connection region may include a first connection region connected between the first through-region portions of the first and second through-regions, a second connection region connected between the second through-region portions of the first and second through-regions, and a third connection region connected between the third through-region portions of the first and second through-regions.

The first through-region portion of the first through-region, the first connection region, the first through-region portion of the second through-region, the second through-region portion of the second through-region, the second connection region, the second through-region portion of the first through-region, the third through-region portion of the first through-region, the third connection region, and the third through-region portion of the second through-region may be sequentially connected in the bus bar.

The bus bar may be formed in an S-shape integrally extended.

The bus bar may further include support portions at inner side portions of the first and third through-region portions, the support portions being configured to apply a force to the terminal portions toward an outside of the bus bar.

The one of the terminal portions and a through-hole of the two or more through-holes may be coupled to each other by a hook structure.

A hook groove may be formed in the one of the terminal portions, and the first through-hole formed in the first through-region portion of the bus bar may be mounted on the hook groove, such that the bus bar is hook-coupled to the one of the terminal portions.

According to an aspect of embodiments of the present invention, in the battery module, the bus bar is fixed to the terminal portions using a forcible insertion method, such that the bus bar may be prevented or substantially prevented from being separated from the terminal portions without any separate fixing member.

According to another aspect of embodiments of the present invention, tension may be provided to the bus bar by forming the bending portion in the connection region, such that the coupling between the bus bar and the terminal portion is further strengthened.

Other features and aspects of embodiments of the present invention will become more apparent from the following detailed description, taken in conjunction with the accompanying drawings.

BRIEF DESCRIPTION OF THE DRAWINGS

Some example embodiments of the present invention are described more fully hereinafter with reference to the accompanying drawings; however, the present invention may be embodied in different forms and should not be construed as limited to the embodiments set forth herein. Rather, the accompanying drawings, together with the specification, illustrate some example embodiments of the present invention, and serve to explain principles and aspects of the present invention.

In the drawing figures, dimensions may be exaggerated for clarity of illustration. Like reference numerals refer to like elements throughout.

DETAILED DESCRIPTION

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. It will be understood that when an element is referred to as being "between" two elements, it can be the only element between the two elements, or one or more intervening elements may also be present. In addition, when an element is referred to as being "on" another element, it can be directly on the another element or indirectly on the another element with one or more intervening elements interposed therebetween. Similarly, when an element is referred to as being "connected to" another element, it can be directly connected to the another element or indirectly connected to the another element with one or more intervening elements interposed therebetween. Further, terms or words used in this specification and claims should not be restrictively interpreted as ordinary meanings or dictionary-based meanings, but should be interpreted to have meanings and concepts conforming to the scope of the present invention.

Figure 1:
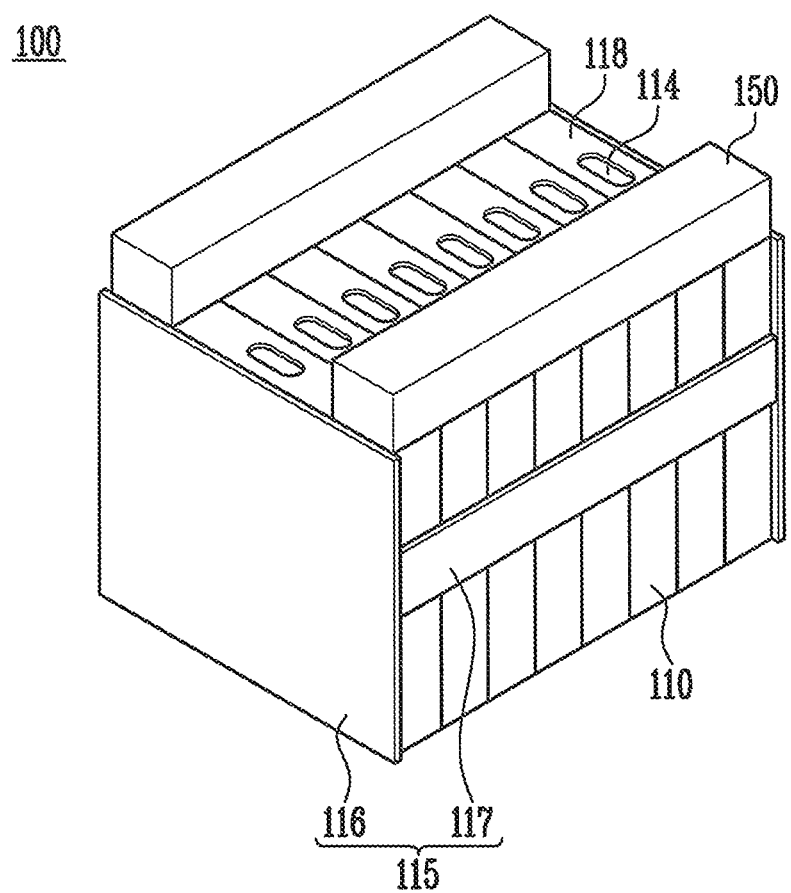
FIG. 1 is a perspective view of a battery module according to an embodiment of the present invention.
Figure 2:
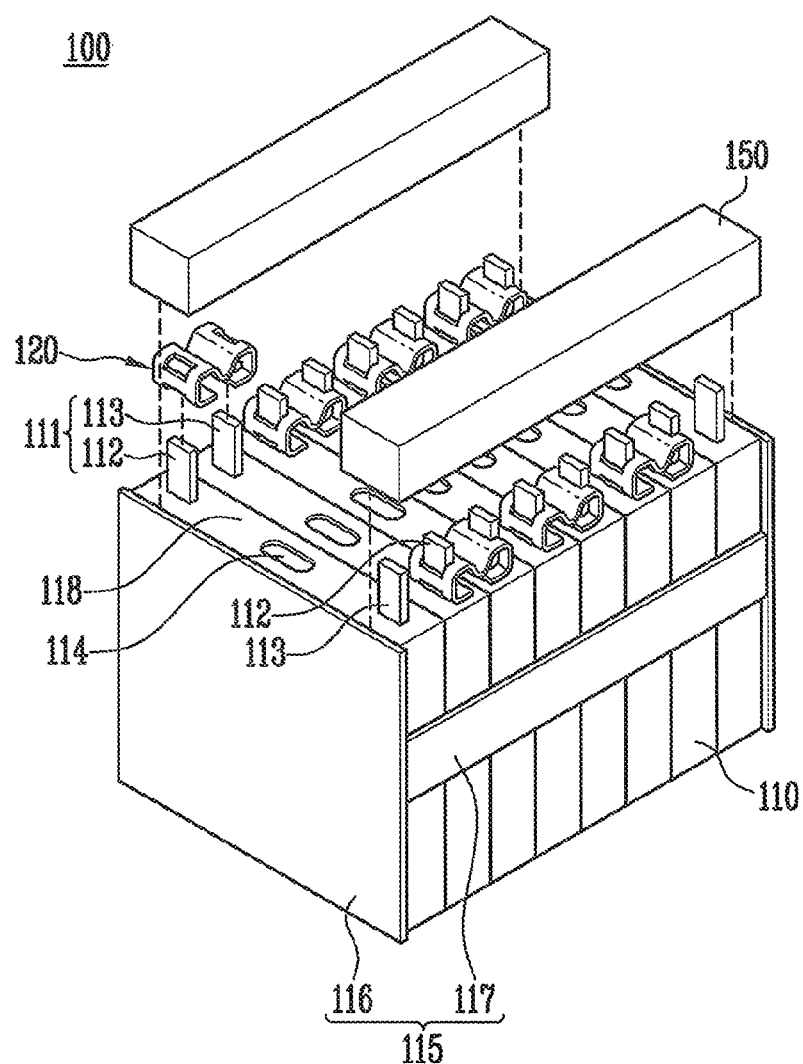
FIG. 2 is an exploded perspective view of the battery module of FIG. 1.

FIG. 1 is a perspective view of a battery module 100 according to an embodiment of the present invention. FIG. 2 is an exploded perspective view of the battery module 100. The battery module 100 according to an embodiment of the present invention is described below with reference to FIGS. 1 and 2.

As shown in FIGS. 1 and 2, the battery module 100 according to an embodiment of the present invention includes a plurality of battery cells 110 aligned in a direction, a bus bar 120 configured to electrically connect between terminal portions 111 of different battery cells 110, and a cover member 150 configured to cover top surfaces 118 of the battery cells 110, on which the terminal portions 111 are provided. The bus bar 120 is fixed to the terminal portions 111 without any separate fixing member.

The battery cell 110 is a member that generates energy. The battery module 100 includes a plurality of the battery cells 110. The battery cells 110 may be aligned in a direction.

In one embodiment, each of the battery cells 110 may include a battery case having an open end, and an electrode assembly and an electrolyte, which are accommodated in the battery case. The electrode assembly and the electrolyte may generate energy through an electrochemical reaction therebetween, and the open end of the battery case may be sealed by the top surface 118 of the battery cell 110 including, for example, a cap assembly. The terminal portions 111 may include positive and negative electrode terminals 112 and 113 having different polarities may protruding from the top surface 118 of the battery cell 110, and a vent portion 114 may be further provided as a safety means in the top surface 118 of the battery cell 110.

In one embodiment, the battery module 100 may further include a fixing portion 115 configured to fix the battery cells 110 to be aligned in a direction. The fixing portion 115 may include a pair of end plates 116 disposed at outer sides of the plurality of battery cells 110, and a connection plate 117 configured to connect between the end plates 116. The plurality of battery cells 110 may be aligned between the pair of end plates 116. In one embodiment, the battery cells 110 may be aligned in parallel to one another so that wide front surfaces of the battery cells 110 face each other. In one embodiment, the fixing portion 115 is used to stably fix the battery cells 110, but the present invention is not limited to the configuration of the fixing portion 115 shown in the drawings. That is, in other embodiments, the fixing portion 115 may have any of various suitable configurations for fixing the battery cells 110. For example, the shape of a housing configured to entirely accommodate the battery cells 110 may also be included in the fixing portion 115. The connection structure between the battery cells 110 and the number of the battery cells 110 may be variously modified according to the design of the battery module 100. Although it is illustrated in FIGS. 1 and 2 that adjacent battery cells 110 come in contact with each other, the present invention is not limited thereto. For example, in another embodiment, the battery cells 110 may be positioned to be spaced apart from each other, such as via a spacer provided in a space between the battery cells 110 to be spaced apart from each other.

Figure 3:
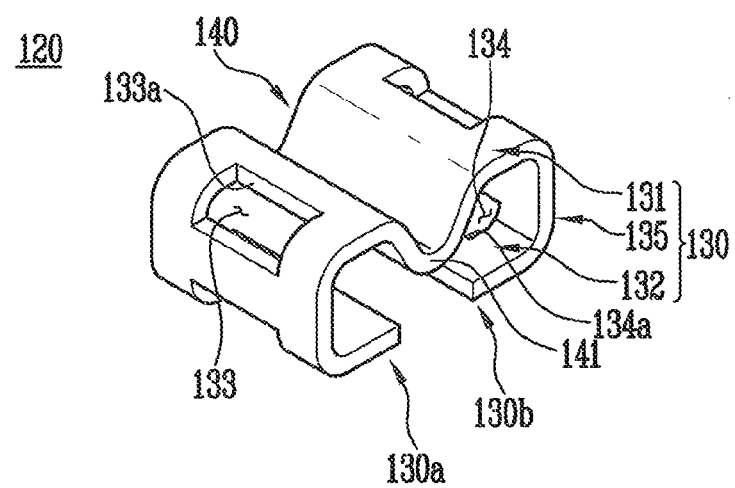
FIG. 3 is a perspective view of a bus bar of the battery module of FIG. 1, according to an embodiment of the present invention.
Figure 4:
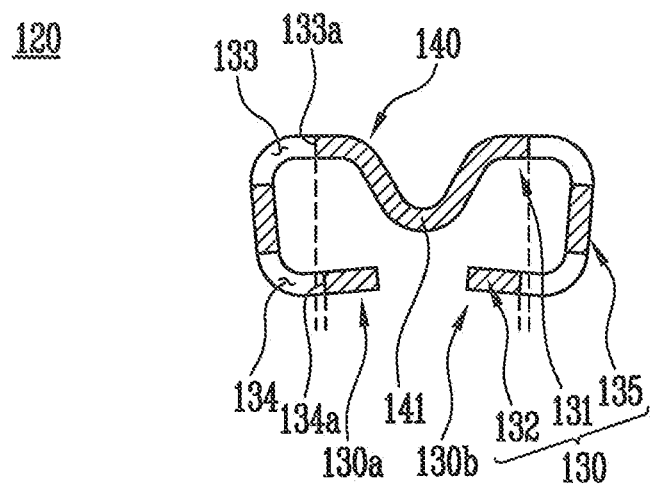
FIG. 4 is a sectional view of the bus bar of FIG. 3.
Figure 5:
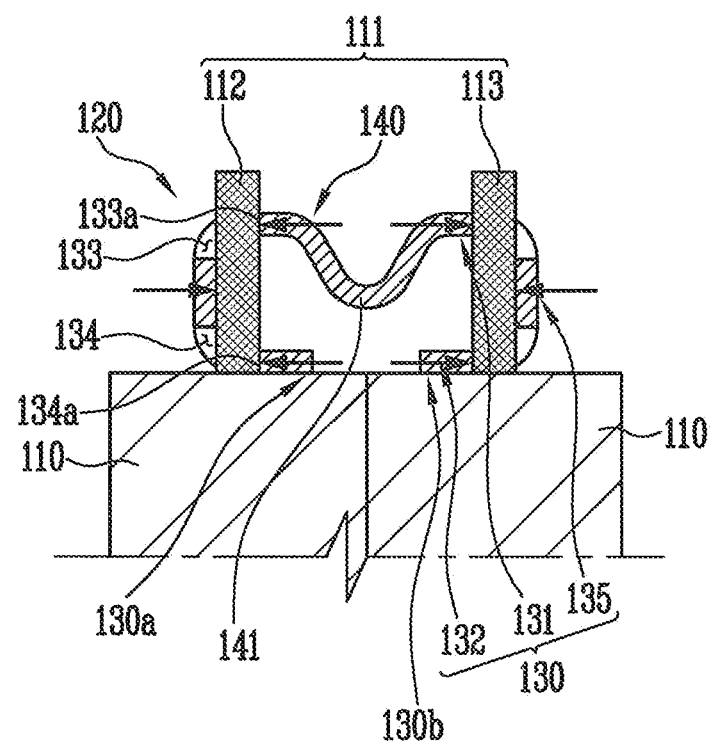
FIG. 5 is a sectional view showing a state in which the bus bar is fastened to terminal portions of the battery module of FIG. 1, according to an embodiment of the present invention.

FIG. 3 is a perspective view of the bus bar 120 of the battery module 100, according to an embodiment of the present invention. FIG. 4 is a sectional view of the bus bar 120 shown in FIG. 3. FIG. 5 is a sectional view showing a state in which the bus bar 120 is fastened to the terminal portions 111 of the battery module 100. The bus bar 120 according to an embodiment of the present invention is described below with reference to FIGS. 3 to 5.

The bus bar 120 is a member that electrically connects terminal portions 111 of different battery cells 110.

In one embodiment, the bus bar 120, as shown in FIG. 2, electrically connects the positive electrode terminal 112 of one battery cell 110 and the negative electrode terminal 113 of another battery cell 110 adjacent to the one battery cell 110 to each other, such that the two battery cells 110 may be connected in series to each other. Alternatively, the bus bar 120 may electrically connect the positive or negative electrode terminal 112 or 113 of one battery cell 110 and the positive or negative electrode terminal 112 or 113 of another battery cell 110 adjacent to the one battery cell 110 to each other, such that the two battery cells 110 may be connected in parallel to each other. The bus bar 120 may be made of an electrically conductive metal, such as gold, silver, copper, or nickel so as to electrically connect between the terminal portions 111 of the two battery cells 110. The bus bar 120, in one embodiment, is coupled to the terminal portions 111, using a forcible insertion method, so as to be fixed to the terminal portions 111 without any separate fixing member such as a nut or bolt. That is, in one embodiment, the terminal portions 111 are forcibly inserted through the bus bar 120 to fix the bus bar 120 thereto.

In one embodiment, the bus bar 120 may include two through-regions 130 through which the terminal portions 111 of different battery cells 110 respectively pass such that the terminal portions 111 are forcibly inserted into the bus bar 120, and a connection region 140 that connects between the two through-regions 130. This is described in further detail below.

The through-regions 130 are regions through which the terminal portions 111 of different battery cells 110 respectively pass. The through-regions 130 may be respectively provided at both sides of the bus bar 120. The through-region 130 through which the terminal portion 111 of one battery cell 110 passes may be referred to as a first through-region 130a, and through-region 130 through which the terminal portion 111 of another battery cell 110 adjacent to the one battery cell 110 passes may be referred to as a second through-region 130b.

In one embodiment, two through-holes 133 and 134 may be provided in a double-layered type in each of the through-regions 130, such that one terminal portion 111 passes through the two through-holes 133 and 134. The through-region 130 may include a first through-region portion 131 extended from the connection region 140 and having the first through-hole 133 formed therein, a support region 135 bent to extend from the first through-region portion 131 and supporting a side surface of the terminal portion 111, and a second through-region portion 132 bent to extend from the support region 135 and having the second through-hole 134 formed therein. Thus, when the bus bar 120 is fastened to the terminal portion 111, the terminal portion 111 first passes through the second through-hole 134 and then passes through the first through-hole 133, such that the side surface of the terminal portion 111 can be supported by the two through-holes 133 and 134. The support region 135 can support the side surface of the terminal portion 111 by coming in contact with the side surface of the terminal portion 111.

The connection region 140 is a region that connects between the first and second through-regions 130a and 130b through which the terminal portions 111 of different battery cells 110 respectively pass.

The connection region 140 may be integrally formed with the through-regions 130. The connection region 140, in one embodiment, has a bending portion 141 to provide tension to the bus bar 120. The bending portion 141 provides a force with which the through-region 130 of the bus bar 120 is expanded in an outer direction, and, accordingly, the forcible insertion between the terminal portion 111 and the bus bar 120 can be further strengthened. Although it has been illustrated in FIGS. 2 to 5 that the connection region 140 of the bus bar 120 is connected to an upper portion of the through-regions 130 (i.e. the first through-region portion 131), the present invention is not limited thereto, and, in another embodiment, the connection region 140 of the bus bar 120 may be connected to a lower portion of the through-region 130. That is, the bus bar 120 may be turned in the opposite direction such that the terminal portion 111 is inserted into the bus bar 120.

A state in which the terminal portions 111 are forcibly inserted into the bus bar 120 is described below with reference to FIGS. 4 and 5.

When the bus bar 120 is separated from the terminal portions 111, as shown in FIG. 4, the second through-region portion 132 in the through-region 130 of the bus bar 120 may be in a state in which the second through-region portion 132 is slightly pulled inward relative to a center of the bus bar 120. Accordingly, an inner portion 134a of the second through-hole 134 can be positioned slightly further inward than an inner portion 133a of the first through-hole 133. That is, the centers of the first and second through-holes 133 and 134 may be nonconcentric with each other (e.g., crossing each other, or parallel and offset from each other). If the terminal portions 111 are inserted into the respective through-holes 133 and 134 of the bus bar 120, as shown in FIG. 5, the bus bar 120 may be slightly warped or elastically deformed, such that the terminal portions 111 can be inserted into the two through-holes 133 and 134. Thus, the inner portion 134a of the second through-hole 134 may be displaced to a same vertical line as the inner portion 133a of the first through-hole 133 while being pushed outward. Accordingly, the inner portions 133a and 134a of the first and second through-holes 133 and 134 can apply a force with which the terminal portion 111 is pushed in an outer direction of the bus bar 120, and the support region 135 can apply a force with which the terminal portion 111 is pushed in an inner direction of the bus bar. That is, the terminal portion 111 may receive a force toward the outside of the bus bar 120 at upper and lower portions thereof, and may receive a force toward the inside of the bus bar 120 at a middle portion thereof. Accordingly, the terminal portion 111 can be forcibly inserted into the bus bar 120 without any fixing member such as a separate bolt or nut, and the bus bar 120 cannot be easily separated from the terminal portion 111.

Figure 6:
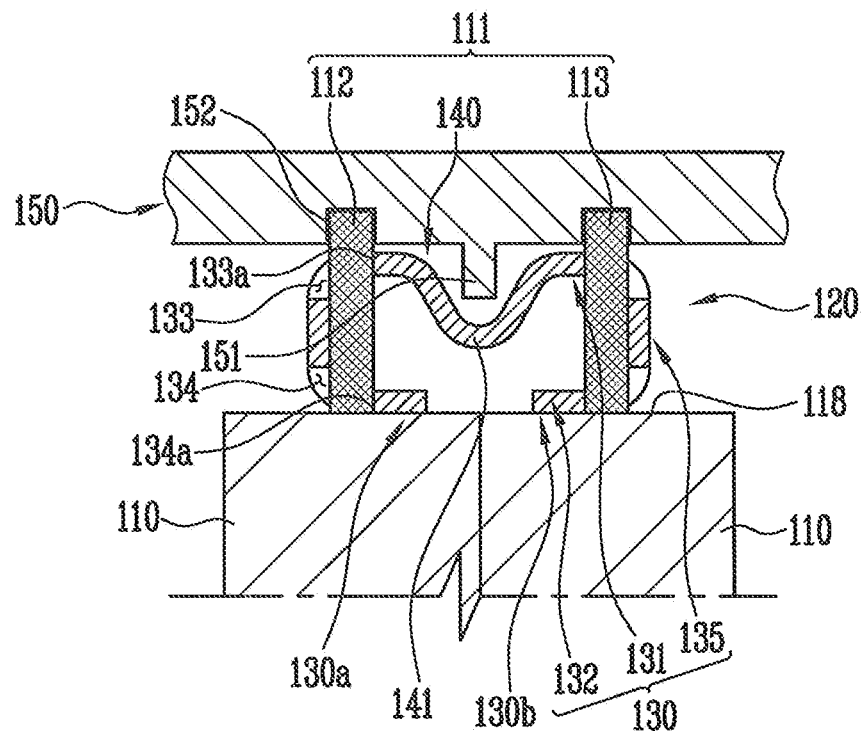
FIG. 6 is a partial sectional view of the battery module of FIG. 1.

FIG. 6 is a partial sectional view of the battery module 100. The cover member 150 of the battery module 100 according to an embodiment of the present invention is described below with reference to FIG. 6.

In one embodiment, the cover member 150 may be positioned to cover the top surface 118 of the battery cell 110, i.e. the surface of the battery cell 110 from which the terminal portion 111 is protruded, and accordingly, the terminal portion 111 and the bus bar 120 may be prevented or substantially prevented from being short-circuited with an external conductor. In one embodiment, a rib 151 may be protruded at an inner side of the cover member 150. The rib 151 may be positioned to correspond to the bending portion 141 of the connection region 140 of the bus bar 120. Thus, the rib 151 can perform a function of supporting the bus bar 120 such that the bus bar 120 is not separated from the terminal portions 111. In one embodiment, a terminal groove 152 into which the terminal portion 111 may be inserted may be provided in an inner side of the cover member 150.

In one embodiment, the cover member 150 may be fixed by being connected to the end plate 116 or the connection plate 117 of the fixing portion 115. Alternatively, the cover member 150 may be fixed to the battery module 100 by forcibly inserting the terminal portion 111 into the terminal groove 152. Although it is illustrated in FIGS. 1, 2 and 6 that the cover member 150 covers terminal portions 111 at a side of the plurality of battery cells 110, the present invention is not limited thereto. For example, in one embodiment, the cover member 150 may be implemented to cover only any two terminal portions 111, i.e. any one bus bar 120, or may be implemented to cover all the top surfaces 118 of the plurality of battery cells 110, so as to cover all the terminals 111 at both sides of the plurality of the battery cells 110.

Figure 7:
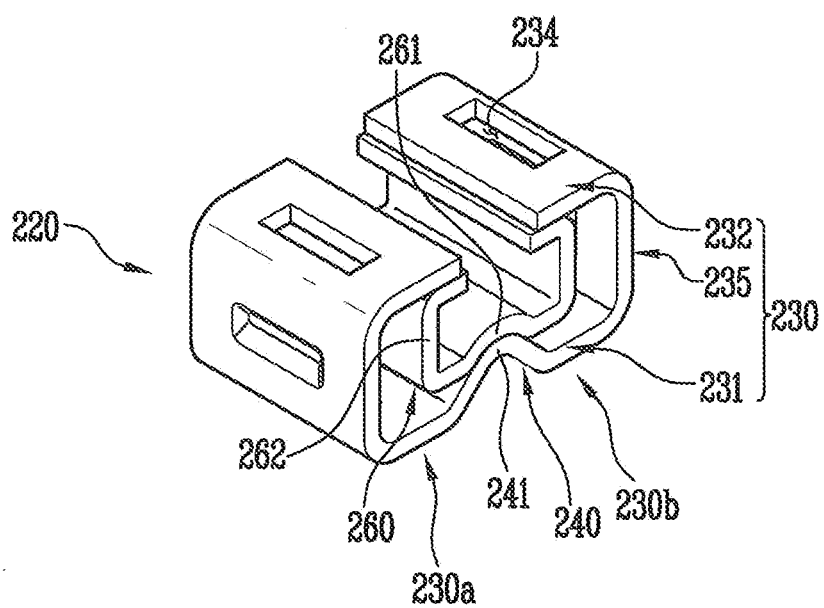
FIG. 7 is a perspective view of a bus bar and an auxiliary bus bar of a battery module, according to another embodiment of the present invention.
Figure 8:
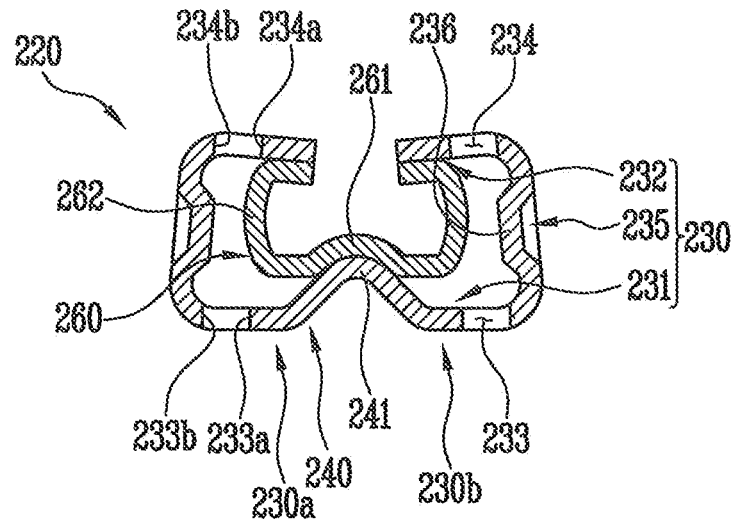
FIG. 8 is a sectional view of the bus bar and the auxiliary bus bar of FIG. 7.
Figure 9:
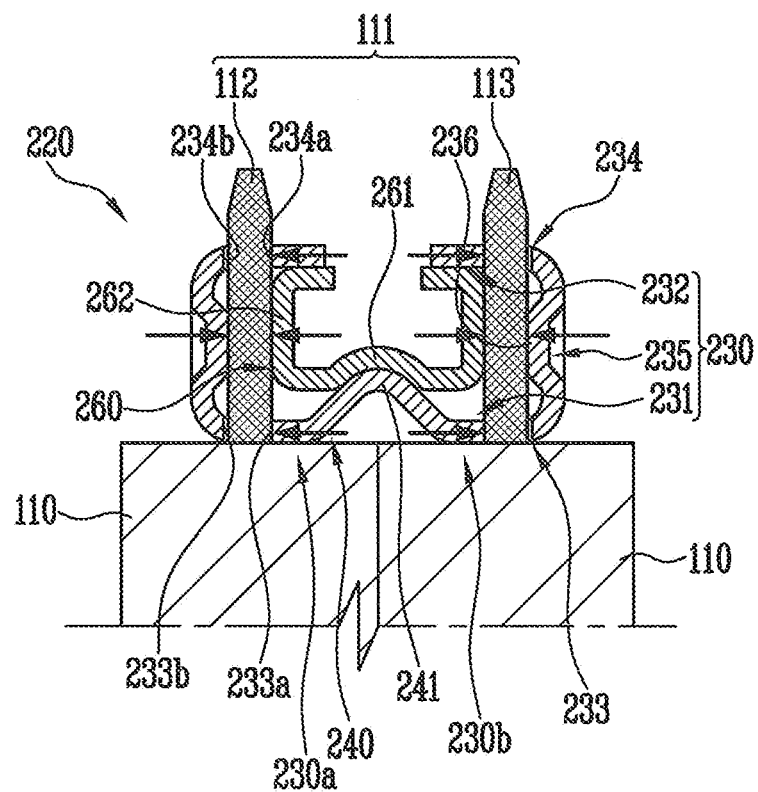
FIG. 9 is a sectional view showing a state in which the bus bar and the auxiliary bus bar of FIG. 7 are fastened to terminal portions.

FIG. 7 is a perspective view of a bus bar 220 and an auxiliary bus bar 260 of a battery module, according to another embodiment of the present invention. FIG. 8 is a sectional view of the bus bar 220 and the auxiliary bus bar 260 shown in FIG. 7. FIG. 9 is a sectional view showing a state in which the bus bar 220 and the auxiliary bus bar 260 are fastened to the terminal portions 111. A battery module including the bus bar 220 and the auxiliary bus bar 260 according to an embodiment of the present invention is described below with reference to FIGS. 7 to 9. Components or aspects which are the same or correspond to those of the previously described embodiments are designated by like reference numerals, and further detailed descriptions thereof will be omitted.

In a battery module according to an embodiment of the present invention, a protruding portion 236 is provided in a support region 235 of a through-region 230 of the bus bar 220, and the bus bar 220 further includes the auxiliary bus bar 260.

The bus bar 220 may include two through-regions 230, that is, first and second through-regions 230a and 230b, each configured to include a first through-region portion 231, a support region 235, and a second through-region portion 232, and a connection region 240 configured to connect the two through-regions 230a and 230b, and the connection region 240 may have a bending portion 241.

In one embodiment, the protruding portion 236 may be protruded toward the terminal portion 111 in the support region 235 of the through-region 230. In one embodiment, the protruding portion 236 is provided in the support region 235, and, accordingly, the protruding portion 236 may apply a force on the terminal portion 111 toward the inside of the bus bar 220. When the bus bar 220 is separated from the terminal portion 111, as shown in FIG. 8, a front end, or inner end, of the protruding portion 236 of the bus bar 220 may be protruded further inward than an outer side portion 233b or 234b of a through-hole 233 or 234. Thus, if the terminal portion 111 is inserted into the bus bar 220, the protruding portion 236 is pushed toward the outside of the bus bar 220. Accordingly, the protruding portion 236 can apply a force against an outer side of the terminal portion 111 toward the inside of the bus bar 220. An inner side portion 233a or 234a of the through-hole 233 or 234 can apply a force against an inner side of the terminal portion 111 pushing outward as a reactive force against the force applied by the protruding portion 236. As a result, the terminal portion 111 can receive the force applied toward the outside of the bus bar 220 by the inner side portion 233a of the first through-hole 233 at an upper portion thereof, the force applied toward the inside of the bus bar 220 by the protruding portion 236 at a middle portion thereof, and the force applied toward the outside of the bus bar 220 by the inner side portion 234a of the second through-hole 234 at a lower portion thereof. Thus, the bus bar 220 cannot be easily separated from the terminal portion 111. Accordingly, the bus bar 220 may be fixed to the terminal portion 111 without any separate fixing member.

While it has been described in this embodiment that the terminal portion 111 is inserted into the bus bar 220 in the state in which the bus bar 220 is turned in the opposite direction, the present invention is not limited thereto, and may be implemented in the form and opposite insertion direction shown in FIG. 2.

The auxiliary bus bar 260, in one embodiment, is a member mounted inside the bus bar 220 with the terminal portion 111 interposed therebetween.

In one embodiment, the auxiliary bus bar 260 is further provided, such that the bus bar 220 may be positioned at the outside of the terminal portion 111 and the auxiliary bus bar 260 may be positioned at the inside of the terminal portion 111. In one embodiment, like the bus bar 220, the auxiliary bus bar 260 may have an auxiliary bending portion 261.

Accordingly, tension is also provided to the auxiliary bus bar 260, such that the auxiliary bus bar 260 can support the terminal portion 111 while pushing the terminal portion 111 toward the outside of the bus bar 220. An auxiliary support region 262 extended from the auxiliary bending portion 261 may be provided in the auxiliary bus bar 260. The auxiliary support region 262 may support the terminal portion 111 while coming in surface contact with a side surface of the terminal portion 111.

The auxiliary bus bar 260, in one embodiment, may have a shape corresponding to that of the bus bar 220. Accordingly, the auxiliary bus bar 260 can stably support upper, middle, and lower portions of the terminal portion 111. Further, the auxiliary bending portion 261 of the auxiliary bus bar 260 may correspond to the bending portion 241 of the bus bar 220, and may overlap with the bending portion 241 of the bus bar 220, thereby maximizing or increasing the tension between the bending portion 261 of the auxiliary bus bar 260 and the bending portion 241 of the bus bar 220.

Figure 10:
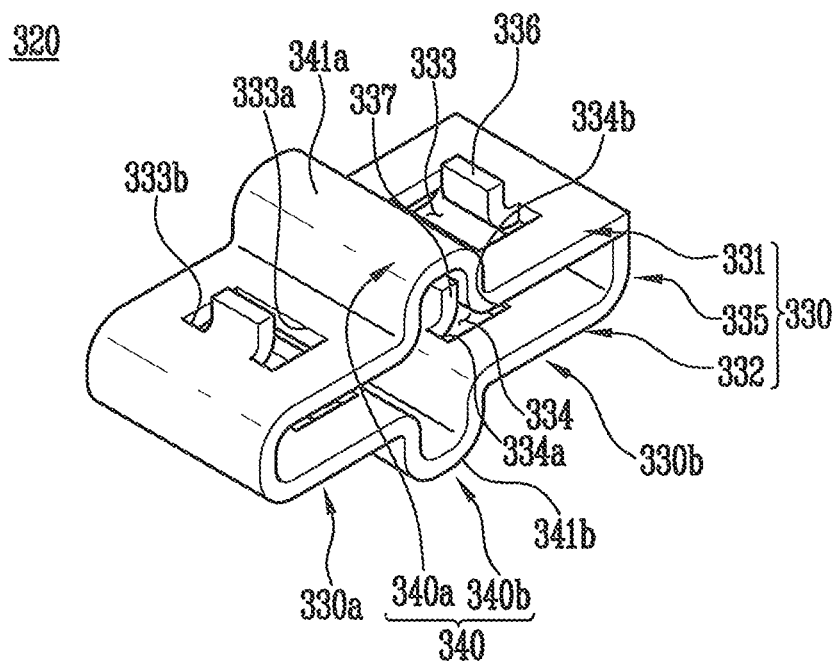
FIG. 10 is a perspective view of a bus bar of a battery module, according to another embodiment of the present invention.
Figure 11:
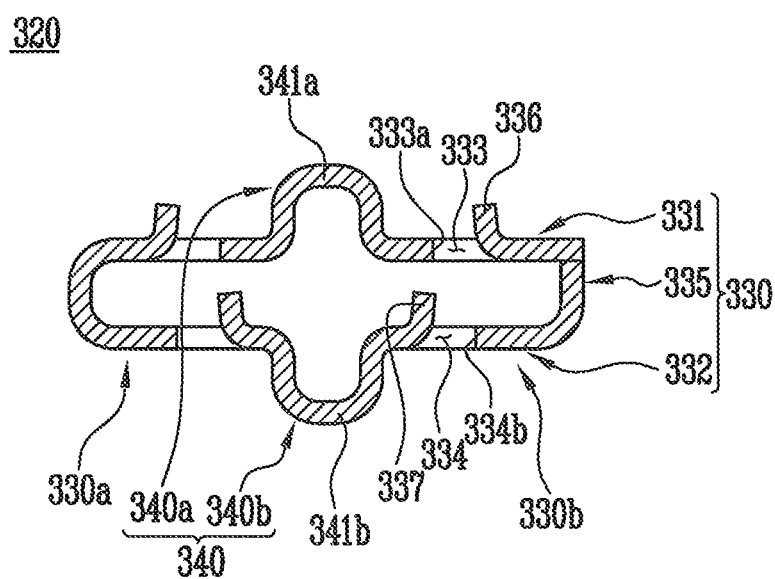
FIG. 11 is a sectional view of the bus bar of FIG. 10.
Figure 12:
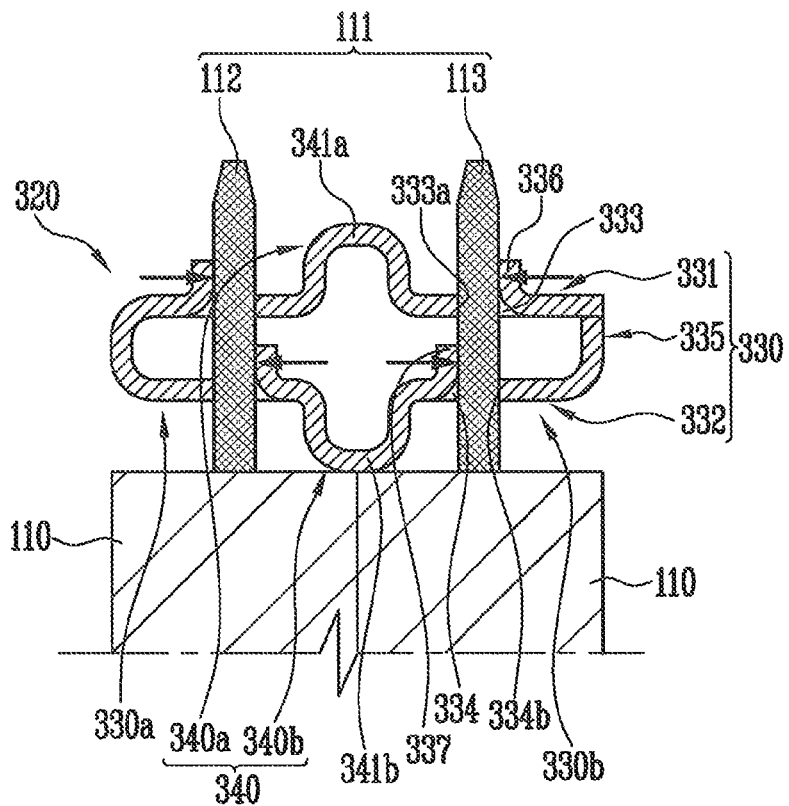
FIG. 12 is a sectional view showing a state in which the bus bar of FIG. 10 is fastened to terminal portions.

FIG. 10 is a perspective view of a bus bar 320 of a battery module, according to another embodiment of the present invention. FIG. 11 is a sectional view of the bus bar 320 shown in FIG. 10. FIG. 12 is a sectional view showing a state in which the bus bar 320 is fastened to the terminal portions 111. A battery module including the bus bar 320 according to an embodiment of the present invention is described below with reference to FIGS. 10 to 12. Components or aspects which are the same or correspond to those of the previously described embodiments are designated by like reference numerals, and further detailed descriptions thereof will be omitted.

The bus bar 320 of a battery module according to an embodiment of the present invention includes two through-regions 330, that is, first and second through-regions 330a and 330b, through which the terminal portions 111 of different battery cells 110 respectively pass, and a connection region 340 configured to connect between the two through-regions 330. In one embodiment, the connection region 340 includes first and second connection regions 340a and 340b, and the first and second connection regions 340a and 340b have bending portions 341a and 341b, respectively.

The through-region 330 is a portion through which the terminal portion 111 of the battery cell 110 passes. The through-region 330 may include a first through-region portion 331, a support region 335, and a second through-region portion 332.

A first through-hole 333 may be formed in the first through-region portion 331, and a second through-hole 334 may be formed in the second through-region portion 332. Thus, when the terminal portions 111 are inserted into the bus bar 320, one terminal portion 111 can sequentially pass through the second through-hole 334 and then pass through the first through-hole 333. The support region 335 may correspond to a region that connects the first and second through-region portions 331 and 332 to each other.

In one embodiment, first and second support portions 336 and 337 may be respectively provided in the vicinity of the first and second through-holes 333 and 334, so as to support the terminal portions 111. In one embodiment, the first support portion 336 is formed at an outer side portion 333b of the first through-hole 333, and the second support portion 337 is formed at an inner side portion 334a of the second through-hole 334. Accordingly, the first and second support portions 336 and 337 may support upper and lower portions of the terminal portions 111 by coming in contact with side surfaces of the terminal portion 111, respectively. Thus, coupling between the terminal portion 111 and the bus bar 320 may be further strengthened. In one embodiment, when the bus bar 320 is separated from the terminal portions 111, as shown in FIG. 11, the first support portion 336 may be protruded further inward than the outer side portion 333b (see FIG. 10) of the first through-hole 333, and the second support portion 337 may be protruded further outward than the inner side portion 334a (see FIG. 10) of the second through-hole 334. Thus, the terminal portion 111 can push the first and second support portions 336 and 337 toward the respective outside and inside of the bus bar 320 while being inserted into the bus bar 320. Accordingly, the first support portion 336 can apply a force with which the terminal portion 111 is pushed toward the inside of the bus bar 320, and the second support portion 337 can apply a force with which the terminal portion 111 is pushed toward the outside of the bus bar 320. Thus, an upper portion of the terminal portion 111 is forcibly inserted between the first support portion 336 and an inner side portion 333a of the first through-hole 333 with respect to the bus bar 320, and a lower portion of the terminal portion 111 is forcibly inserted between the second support portion 337 and an outer side portion 334b of the second through-hole 334, such that the bus bar 320 may be firmly fixed to the terminal portion 111.

In one embodiment, as in the bus bar 120 described above, centers of the first and second through-holes 333 and 334 may be nonconcentric with each other (e.g., crossing each other, or parallel and offset from each other). Accordingly, coupling between the terminal portion 111 and the bus bar 320 may be further strengthened.

The connection region 340 is a portion that connects the first and second through-regions 330a and 330b to each other. The connection region 340 may include the first and second connection regions 340a and 340b.

In one embodiment, the first bending portion 341a may be provided in the first connection region 340a, and the second bending portion 341b may be provided in the second connection region 340b. The first and second bending portions 341a and 341b provide tension to the bus bar 320, and, accordingly, the coupling between the terminal portion 111 and the bus bar 320 can be further strengthened. The first and second bending portions 341a and 341b may be bent to face opposite directions to each other.

In one embodiment, the bus bar 320 includes two connection regions 340, such that the first through-region portion 331 is connected to the first connection region 340a, and the second through-region portion 332 is connected to the second connection region 340b. Thus, the bus bar 320 can be implemented such that an entire region of the bus bar 320 forms a closed curve shape.

Figure 13:
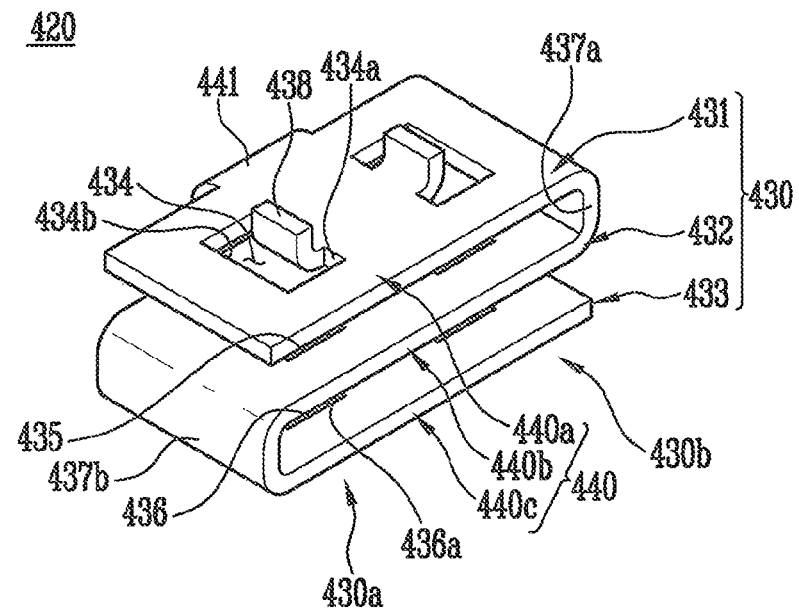
FIG. 13 is a perspective view of a bus bar of a battery module, according to another embodiment of the present invention.
Figure 14:
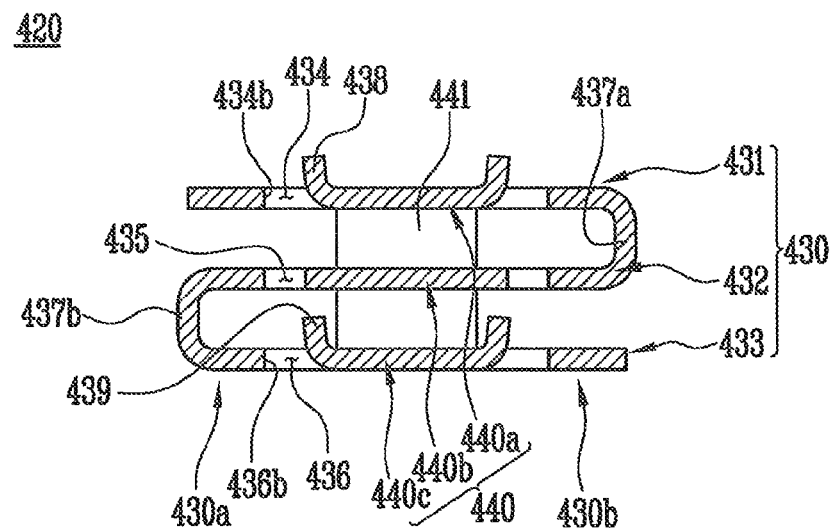
FIG. 14 is a sectional view of the bus bar of FIG. 13.
Figure 15:
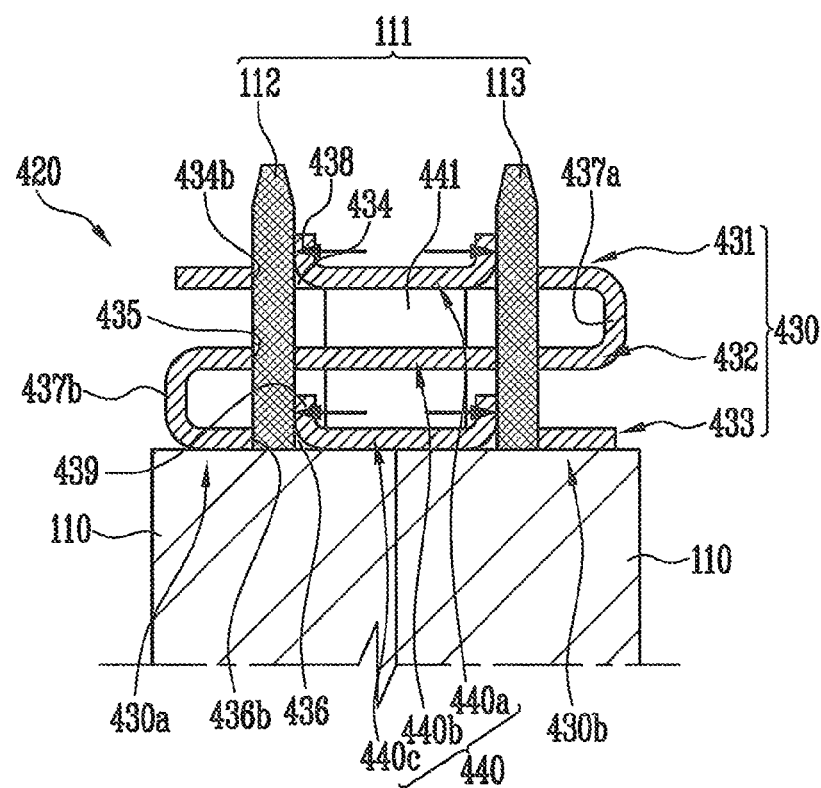
FIG. 15 is a sectional view showing a state in which the bus bar of FIG. 13 is fastened to terminal portions.

FIG. 13 is a perspective view of a bus bar 420 of a battery module, according to another embodiment of the present invention. FIG. 14 is a sectional view of the bus bar 420 shown in FIG. 13. FIG. 15 is a sectional view showing a state in which the bus bar 420 is fastened to the terminal portions 111. A battery module including the bus bar 420 according to an embodiment of the present invention is described below with reference to FIGS. 13 to 15. Components or aspects which are the same or correspond to those of the previously described embodiments are designated by like reference numerals, and further detailed descriptions thereof will be omitted.

The bus bar 420 of a battery module according to an embodiment of the present invention includes a through-region 430 and a connection region 440. In one embodiment, the bus bar 420 forms an "S" shape, and three through-holes 434, 435, and 436 are formed in each of first and second through-regions 430a and 430b.

The bus bar 420 may include the first and second through-regions 430a and 430b through which the terminal portions 111 of different battery cells 110 respectively pass, and a connection region 440 configured to connect between the first and second through-regions 430a and 430b.

In one embodiment, each of the first and second through-regions 430a and 430b may include a first through-region portion 431, a second through-region portion 432, and a third through-region portion 433. The first, second, and third through-holes 434, 435, and 436 may be formed through the first, second, and third through-region portions 431, 432 and 433. The bus bar 420 may be implemented such that one terminal portion 111 passes through all of the three through-holes 434, 435, and 436.

In one embodiment, the connection region 440 may include three regions. Specifically, the connection region 440 may include a first connection region 440a configured to connect the first through-region portion 431 of the first through-region 430a and the first through-region portion 431 of the second through-region 430b to each other, a second connection region 440b configured to connect the second through-region portion 432 of the first through-region 430a and the second through-region portion 432 of the second through-region 430b to each other, and a third connection region 440c configured to connect the third through-region portion 433 of the first through-region 430a and the third through-region portion 433 of the second through-region 430b to each other.

In one embodiment, the first connection region 440a may be extended from the first through-region portion 431 of the first through-region 430a, the first through-region portion 431 of the second through-region 430b may be extended from the first connection region 440a, and the second through-region portion 432 of the second through-region 430b may be bent to extend from the first through-region portion 431 of the second through-region 430b. The second connection region 440b may be extended from the second through-region portion 432 of the second through-region 430b, the second through-region portion 432 of the first through-region 430a may be extended from the second connection region 440b, and the third through-region portion 433 of the first through-region 430a may be bent to extend from the second through-region portion 432 of the first through-region 430a. The third connection region 440c may be extended from the third through-region portion 433 of the first through-region 430a, and the third through-region portion 433 of the second through-region 430b may be extended from the third connection region 440c. That is, the first through-region portion 431 of the first through-region 430a, the first connection region 440a, the first through-region portion 431 of the second through-region 430b, the second through-region portion 432 of the second through-region 430b, the second connection region 440b, the second through-region portion 432 of the first through-region 430a, the third through-region portion 433 of the first through-region 430a, the third connection region 433, and the third through-region portion 433 of the second through-region 430b may be sequentially extended, such that the bus bar 420 forms the "S" shape as the three through-regions 431, 432, and 433 and the connection regions 440a, 440b, and 440c are integrally bent and extended. A first support region 437a may be formed between the first and second through-region portions 431 and 432 of the second through-region 430b, and a second support region 437b may be formed between the second and third through-region portions 432 and 433 of the first through-region 430a.

In one embodiment, support portions 438 and 439 that support side surfaces of the terminal portion 111 may be provided in the through-region 430. The first support portion 438 may be provided at an inner side portion 434a (shown in FIG. 13) of the first through-hole 434 of the first through-region portion 431, and the second support portion 439 may be provided at an inner side portion 436a (shown in FIG. 13) of the third through-hole 436 of the third through-region portion 433. In one embodiment, as shown in FIG. 14, the first and second support portions 438 and 439 may be further protruded toward the outside of the bus bar 420 than the inner side portions 434a and 436a (shown in FIG. 13) of the through-holes 434 and 436 in a state in which the terminal portions 111 are separated from the bus bar 420. As shown in FIG. 15, the first and second support portions 438 and 439 may be pushed inward as the terminal portions 111 are inserted into the bus bar 420. Thus, an upper portion of the terminal portion 111 is inserted between the first support portion 438 and an outer side portion 434b of the first through-hole 434, and a lower portion of the terminal portion 111 is inserted between the second support portion 439 and an outer side portion 436b of the third through-hole 436, such that the terminal portion 111 may be forcibly inserted into the bus bar 420.

In one embodiment, since the bus bar 420 forms the "S" shape by bending one integral member, the bus bar 420 may be well-warped by an external force. Therefore, in one embodiment, a connection member 441 that connect the first, second, and third connection regions 440a, 440b, and 440c may be further provided. The connection member 441 may be connected vertically to each of the first, second, and third connection regions 440a, 440b, and 440c.

Figure 16:
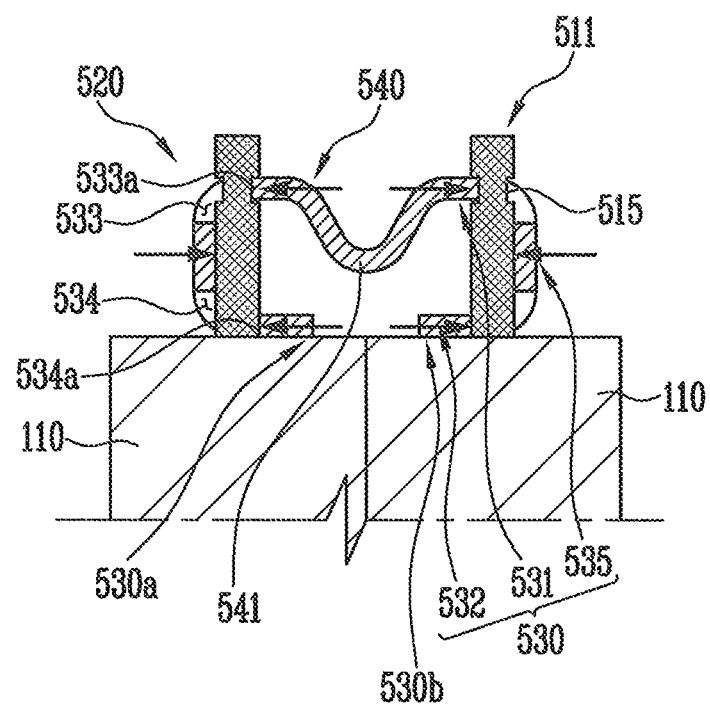
FIG. 16 is a sectional view showing a state in which a bus bar, according to another embodiment of the present invention, is fastened to terminal portions of a battery module.

FIG. 16 is a sectional view showing a state in which a bus bar 520, according to another embodiment of the present invention, is fastened to terminal portions 511 of a battery module. A battery module including the bus bar 520 according to an embodiment of the present invention is described below with reference to FIG. 16. Components or aspects which are the same or correspond to those of the previously described embodiments are designated by like reference numerals, and further detailed descriptions thereof will be omitted.

In one embodiment, a hook groove 515 is formed in the terminal portion 511 of the battery module according to this embodiment, such that the terminal portion 511 and the bus bar 520 are coupled to each other by a hook structure.

The hook groove 515 may be concavely formed toward the inside of the terminal portion 511. In one embodiment, a through-region 530 of the bus bar 520 may include a first through-region portion 531, a second through-region portion 532, and a support portion 535. In one embodiment, a first through-hole 533 of the first through-region portion 531 may be mounted by the hook groove 515. An inner side portion 533a of the first through-hole 533 is mounted on the hook groove 515 of the terminal portion 511, and, accordingly, the hook coupling between the bus bar 520 and the terminal portion 511 may be implemented. That is, although there may be a force with which the bus bar 520 may be separated from the terminal portion 511, the upper end of the inner side portion 533a of the first through-hole 533 is latched to the lower end of the hook groove 515. Therefore, the bus bar 520 may be prevented or substantially prevented from being separated from the terminal portion 511. In one embodiment, a thickness of the first through-region portion 531 is equal to or slightly smaller than that of the hook groove 515 such that the inner side portion 533a of the first through-hole 533 may be mounted on the hook groove 515 of the terminal portion 511. The inner side portion 533a of the first through-hole 533 may be extended further outward than an inner side portion 534a of the second through-hole 534 to be mounted on the hook groove 515, and, therefore, the first through-hole 533 may have an open size smaller than that of the second through-hole 534.

In the battery module according to one embodiment, the coupling between the terminal portion 511 and the bus bar 520 is implemented not only using the coupling caused by the forcible insertion of the bus bar 520 but also using the hook coupling. Thus, the coupling between the terminal portion 511 and the bus bar 520 can be further strengthened. In one embodiment, three inner surfaces of the hook groove 515 of the terminal portion 511 surround three outer surfaces of the inner side portion 533a of the first through-hole 533, such that the coupling between the terminal portion 511 and the bus bar 520 can be further strengthened.

Although it has been described that the hook groove 511 is formed at an upper end of the terminal portion 511, the present invention is not limited thereto, and, in another embodiment, the hook groove 515 may be formed at a lower end of the terminal portion 511 such that the second through-hole 534 is mounted on the hook groove 515. Further, although it is illustrated in FIG. 16 that the upper end of the terminal portion 511 is flat, in another embodiment, the upper end of the terminal portion 511 may be tapered, such that the terminal portion 511 can be more easily inserted into the through-holes 533 and 534.

While the present invention has been described in connection with certain exemplary embodiments, it is to be understood that the invention is not limited to the disclosed embodiments. Although specific terms are employed, they are used and are to be interpreted in a generic and descriptive sense only and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims and equivalents thereof.

What is claimed is:
1. A battery module comprising:
a plurality of battery cells aligned in a direction, the battery cells each comprising a terminal portion on a surface thereof; and
at bus bar configured to connect between the terminal portions of battery cells of the plurality of battery cells, the bus bar comprising through-regions through which the terminal portions of the battery cells are configured to respectively pass, and a connection region connecting the through-regions,
wherein a through-region of the through-regions has two or more through-holes corresponding to each other, a first terminal portion of the terminal portions being configured to pass through the two or more through-holes, and
wherein the terminal portions are forcibly inserted into the bus bar in a connected state.
2. The battery module of claim 1,
wherein the connection region has a bending portion configured to provide tension to the bus bar, and
wherein the bus bar is fixable to the terminal portions by the tension.
3. The battery module of claim 2, further comprising a cover member configured to cover the surface on which the terminal portions are arranged, the cover member comprising as rib at a position corresponding to the bending portion.
4. The battery module of claim 1, wherein the through-region applies a force toward an outside of the bus bar on the first terminal portion that passes through the two or more through-holes of the through-region in the connected state.
5. The battery module of claim 1, wherein the through-region comprises:
a first through-region portion extended from the connection region, the first through-region portion having a first through-hole of the two or more through-holes formed therein, wherein the first terminal portion passes through the first through-hole in the connected state;
a support region bent to extend from the first through-region portion; and
a second through-region portion bent to extend from the support region, the second through-region portion having a second through-hole of the two or more through-holes formed therein, wherein the first terminal portion passes through the second through-hole in the connected state.
6. The battery module of claim 5, wherein centers of the first and second through-holes are nonconcentric with each other in a state in which the bus bar is separated from the terminal portions.
7. The battery module of claim 5,
wherein the support region comprises a protruding portion protruded toward the first terminal portion in the connected state, and
wherein the protruding portion applies a force toward an inside of the bus bar on the the first terminal portion in the connected state.
8. The battery module of claim 5, wherein the connection region comprises a first connection region extended from the first through-region portion, and a second connection region extended from the second through-region portion, each of the first and second connection regions comprising a respective bending portion.
9. The battery module of claim 8, wherein the bending, portion of the first connection region and the bending portion of the second connection region are protruded toward opposite directions from each other.
10. The battery module of claim 5,
wherein the first through-region portion comprises a first support portion at an outer side portion of the first through-hole and configured to apply a force on the first terminal portion toward an inside of the bus bar by contacting a side surface of the first terminal portion, and
wherein the second through-region portion comprises a second support portion at an inner side portion of the second through-hole and configured to apply a force on the first terminal portion toward an outside of the bus bar by contacting a side surface of the first terminal portion.
11. The battery module of claim 5,
wherein a hook groove is formed in the first terminal portion, and
wherein the first through-hole formed in the first through-region portion of the bus bar is mounted on the hook groove in the connected state such that the bus bar is hook-coupled to the one of the terminal portions.
12. The battery module of claim 1, further comprising an auxiliary bus bar mounted inside the bus bar, and the first terminal portion passes between the bus bar and the auxiliary bus bar in the connected state.
13. The battery module of claim 12, wherein the auxiliary bus bar comprises an auxiliary bending portion configured to apply a force to the first terminal portion toward an outside of the auxiliary bus bar by providing tension to the auxiliary bus bar.

14. The battery module of claim 1, wherein the two or more through-holes includes three through-holes formed to correspond to each other, the first terminal portion being configured to pass through the three through-holes.

15. The battery module of claim 14, wherein the bus at is formed in an S-shape integrally extended.

16. The battery module of claim 1,
wherein the through-regions include a first through-region through which the terminal portion of a first battery cell of the plurality of battery cells passes in the connected state, and a second through-region through which the terminal portion of a second battery cell of the plurality of battery cells adjacent to the first battery cell passes in the connected state, and
wherein the connection region connects the first and second through-regions.

17. The battery module of claim 16,
wherein each of the first and second through-regions includes a first through-region portion having a first through-hole formed therein, a second through-region portion having a second through-hole formed therein, and a third through-region portion having a third through-hole formed therein, and
wherein the connection region includes a first connection region connected between the first through-region portions of the first and second through-regions, a second connection region connected between the second through-region portions of the first and second through-regions, and a third connection region connected between the third through-region portions of the first and second through-regions.

18. The battery module of claim 17, wherein the first through-region portion of the first through-region, the first connection region, the first through-region portion of the second through-region, the second through-region portion of the second through-region, the second connection region, the second through-region portion of the first through-region, the third through-region portion of the first through-region, the third connection region, and the third through-region portion of the second through-region are sequentially connected in the bus bar.

19. The battery module of claim 17, wherein the bus bar further comprises support portions at inner side portions of the first and third through-region portions, the support portions being configured to apply a force to the terminal portions toward an outside of the bus bar.

20. The battery module of claim 1, wherein the first terminal portion and a through-hole of the two or more through-holes are coupled to each other by a hook structure in the connected gate.

* * * * *